(12) United States Patent
Jaatinen

(10) Patent No.: US 7,796,531 B2
(45) Date of Patent: Sep. 14, 2010

(54) METHOD, A DEVICE AND A SYSTEM FOR TRANSFERRING DATA

(75) Inventor: Jussi Jaatinen, Helsinki (FI)

(73) Assignee: Nokia Corporation, Espoo (FI)

( * ) Notice: Subject to any disclaimer, the term of this patent is extended or adjusted under 35 U.S.C. 154(b) by 683 days.

(21) Appl. No.: 10/591,489

(22) PCT Filed: Mar. 3, 2004

(86) PCT No.: PCT/FI2004/000115

§ 371 (c)(1),
(2), (4) Date: Jul. 20, 2007

(87) PCT Pub. No.: WO2005/086432

PCT Pub. Date: Sep. 15, 2005

(65) Prior Publication Data

US 2007/0280109 A1 Dec. 6, 2007

(51) Int. Cl.
*H04J 1/06* (2006.01)
*H04J 3/24* (2006.01)
(52) U.S. Cl. .................. 370/252; 370/465; 370/474
(58) Field of Classification Search .......... 370/252, 370/465, 474
See application file for complete search history.

(56) References Cited

U.S. PATENT DOCUMENTS

| 7,116,682 | B1 * | 10/2006 | Waclawsky et al. | 370/468 |
|---|---|---|---|---|
| 2003/0125047 | A1 * | 7/2003 | Chen et al. | 455/456 |
| 2006/0053452 | A1 * | 3/2006 | Lee et al. | 725/81 |
| 2007/0204028 | A1 * | 8/2007 | Lee | 709/223 |
| 2008/0070619 | A1 * | 3/2008 | Yu | 455/552.1 |

FOREIGN PATENT DOCUMENTS

| WO | WO 98/56181 | | 12/1998 |
|---|---|---|---|
| WO | WO 00/67435 | * | 5/2000 |
| WO | WO 00/67435 | | 11/2000 |
| WO | WO 02/98057 | * | 5/2002 |
| WO | WO 02/098057 | | 12/2002 |

* cited by examiner

*Primary Examiner*—Andrew Lee
(74) *Attorney, Agent, or Firm*—Alfred A. Fressola; Ware, Fressola, Van Der Sluys & Adolphson LLP

(57) ABSTRACT

A method, a device and a system for transferring data from a data source (212) over both a wireless communications (210) and a fixed communications (208) network to a destination device (204) such that at least one portion of a data aggregate is transmitted through the wireless communications network (210) via a wireless communications device (202) and at least one another portion is transmitted through the fixed communications network (208). The destination device (204) may reconstruct the data aggregate by joining the received data portions together.

29 Claims, 4 Drawing Sheets

US 7,796,531 B2

METHOD, A DEVICE AND A SYSTEM FOR TRANSFERRING DATA

CROSS REFERENCE TO RELATED APPLICATIONS

This application is for entry into the U.S. national phase under §371 for International Application No. PCT/FI2004/000115 having an international filing date of Mar. 3, 2004, and from which priority is claimed under all applicable sections of Title 35 of the United States Code including, but not limited to, Sections 120, 363 and 365(c).

FIELD OF THE INVENTION

The present invention relates generally to communication systems. In particular the invention concerns broadband data access via a plurality of devices utilizing different type of connections.

BACKGROUND OF THE INVENTION

Modern wireless communications systems such as GSM (Global System for mobile communications) and UMTS (Universal Mobile Telecommunications System) are capable of transferring various types of data over the air interface between the network elements such as a base station and a mobile terminal. As the general demand for transfer capacity continuously rises thanks to e.g. new multimedia services coming available, new more efficient techniques have been developed in order to exploit the existing resources to a maximum extent. The demand has already been or is at least going to be supplied with WCDMA (Wideband Code Division Multiple Access), EDGE (Enhanced Data Rates for GSM Evolution) and HSDPA (High-Speed Downlink Packet Access) interfacing/modulation techniques developed for raising the maximum data transfer speeds achievable.

The same analogy applies to broadband access solutions utilizing either solely or, to say, at least mainly fixed connections, i.e. the local area network may be wireless but other network elements starting from the WLAN (Wireless Local Area Network) base station/router are fixedly attached to the rest of the network. Broadband, e.g. xDSL (Digital Subscriber Line), solutions are slowly gaining ground in many industrialized countries. These provide consumers with bit pipes of 256 kbps to 2 Mbps or even more, with the 256 . . . 512 kbps variants being the most popular due to pricing strategies implemented by the operators. Also the forerunner of xDSL, ISDN (Integrated Services Digital Network) is still widely in use and is being marketed. Broadband and ISDN connection are used for Internet browsing, email, file downloading and P2P (Point-to-Point) networking, for example.

These uses, applicable also to wireless data transfer initiated by e.g. mobile terminal owners, may create somewhat bursty traffic, and occasionally the existing, although reasonably high-speed, modern data access means do not cope with the amount of the traffic causing either annoying dropouts in the real-time data playback or just increase the transfer delay to an intolerable level.

See FIG. 1 for illustration of the solution disclosed by publication WO98/56181 comprising means ("interactive channel") for controlling downlink DVB (Digital Video Broadcasting) stream 122 of >2 Mbit/s by utilizing a common GSM terminal, either a typical external model or a built-in version, as an uplink data transfer tool with the DVB set-top-box 114 connected to television 116. The GSM terminal transmits control signals 118 by, for example, embedding them into SMS (Short Message System) messages in uplink direction to be forwarded via a base station 104, BSC (Base Station Controller)/MSC (Mobile Switching Centre) 102 and network 106 to interactive centre 108. Interactive centre 108 then provides distributive central 110 with related control information in order to affect the transmitted broadband service delivery as desired. The GSM terminal thus enables relatively simple control to the subscriber even if DVB set-top-box 114 or network 112 in use does not support return channels of fixed type.

However, notwithstanding the various existing data transfer arrangements that may even utilize different type of data connections, situations may still occur in which the available basic data transfer capacity does not suffice to transfer data to the user equipment, such as a desktop computer, with a reasonable speed or latency.

Earlier, ISDN users have had the option to stack two 64 kbps pipes to acquire double capacity for a session. Disconnecting the other ISDN pipe has required interruption of the session and re-initialisation with a single pipe, which has been done manually. Internet access through wireless protocols has been limited mainly to use during travel, although some users use a flat-rate GPRS connection as their only Internet access method.

SUMMARY OF THE INVENTION

The object of the present invention is to alleviate the deficiencies found in prior art solutions as to, at least occasionally, desired additional data transfer capacity by introducing the concept of multi-pipe data access. With multi-pipe data access the user can gain a better use experience by using already existing hardware to automatically and transparently better adapt to the prevailing level of data traffic.

Today, to an increasing amount, people own or have at least access to both fixed and mobile communications networks, e.g. through desktop computers and portable WCDMA/EDGE/HSDPA enabled handsets. These last-mentioned mobile solutions also provide data pipes ranging up to 960 kbps (WCDMA), 384 kbps (EDGE) or even to 10 Mbit/s (HSDPA) and are thus not meaningless what comes to their possible applicability in relatively demanding data transfer operations as well.

According to the basic idea of the invention both fixed and wireless connections are utilized in transferring one or more data elements constituting a data aggregate to a single end-user device such as a personal computer. The invention can be implemented as a software and/or hardware module that monitors the level of traffic in the fixed connection. Herein the wording "fixed connection" is used to refer to a connection routed mainly through fixed wire-based connections and fixed communications networks but e.g. the access network may still comprise a wireless portion such as a wireless LAN (WLAN) connection between a WLAN network adapter at the end-user device and a WLAN router on the network side.

If the fixed connection is tapped to capacity, i.e. the user is likely downloading a large file, or other preferred conditions apply, the module will commission another data pipe over the wireless protocol and place the transfer capacity of the new pipe at the disposal of the application that is using the fixed connection. The download will then complete at a substantially faster rate, simultaneously over the two pipes. After the download is complete, the multi-pipe driver will realize the fixed connection is no longer tapped to capacity and the wireless pipe can be relinquished.

As to the utility of the invention, most of the time the wireless channel is not in use, which will save mobile terminal battery, transfer capacity, costs etc, but is actually used optionally fully transparently at need in favour of the user when the fixed connection is limiting the overall performance of the system. This results in a better user experience and flexible availability of transmission resources. The invention also provides smaller delays in transfers. Acquiring a faster fixed connection would be much costlier as the operators typically charge a monthly fee for e.g. xDSL use. Furthermore, most of the time the transfer capacity of the faster DSL would be unused. The present invention allows consumers to automatically acquire additional data transfer capacity only when needed.

Still further, the invention allows more dynamic transfer capability allocation well suited to the bursty nature of typical consumer use. An additional advantage is that the invention could be implemented with additional PC software and terminals that have already hit or likely hit the markets soon. There is seemingly a correlation between consumers who own fixed Internet connections and who will own data-enabled terminals suited for the present invention. Thus the users already have the hardware needed to implement the invention, and all that is needed is merely some software that will offer the additional value. Alternatively/additionally the invention may be implemented through tailored hardware, e.g. programmable logic chips, DSP's (Digital Signal Processor), microprocessors, and microcontrollers.

In one aspect of the invention a method for transferring a data aggregate from a data source to a destination device enabled to connect to the data source through a first connection utilizing a fixed communications network, comprises establishing at the destination device a second connection to the data source via a wireless communications device operable in a wireless communications network, receiving portions of said data aggregate through both first and second connections, and joining said portions together to reconstruct said data aggregate.

In another aspect of the invention an electronic device operable in a fixed communications network, comprising a processor and memory for processing instructions and storing data, further comprising a data transfer module for communicating with a wireless communications device operable in a wireless communications network, the device configured for managing transfer of a data aggregate from a data source through said fixed communications network and said wireless communications network via said wireless communications device, said data aggregate divided into at least two portions, one of said at least two portions received through said fixed communications network and the other through said wireless communications network.

In a further aspect a system comprising an electronic device operable in a fixed communications network, said electronic device comprising a processor and memory for processing instructions and storing data, and a wireless communications device operable in a wireless communications network said electronic device further comprising a data transfer module for communicating with said wireless communications device, and the device configured for managing transfer of a data aggregate from a data source through said fixed communications network and said wireless communications network via said wireless communications device, said data aggregate divided into at least two portions, one of said at least two portions received through said fixed communications network and the other through said wireless communications network, and said wireless communications device comprises a receiver for receiving instructions from said electronic device in order to establish a connection to the data source, and the data transfer module for forwarding data from the data source to said electronic device.

BRIEF DESCRIPTION OF THE DRAWINGS

Hereinafter the invention is described in more detail by reference to the attached drawings, wherein.

DETAILED DESCRIPTION OF THE EMBODIMENT OF THE INVENTION

Figure 1:
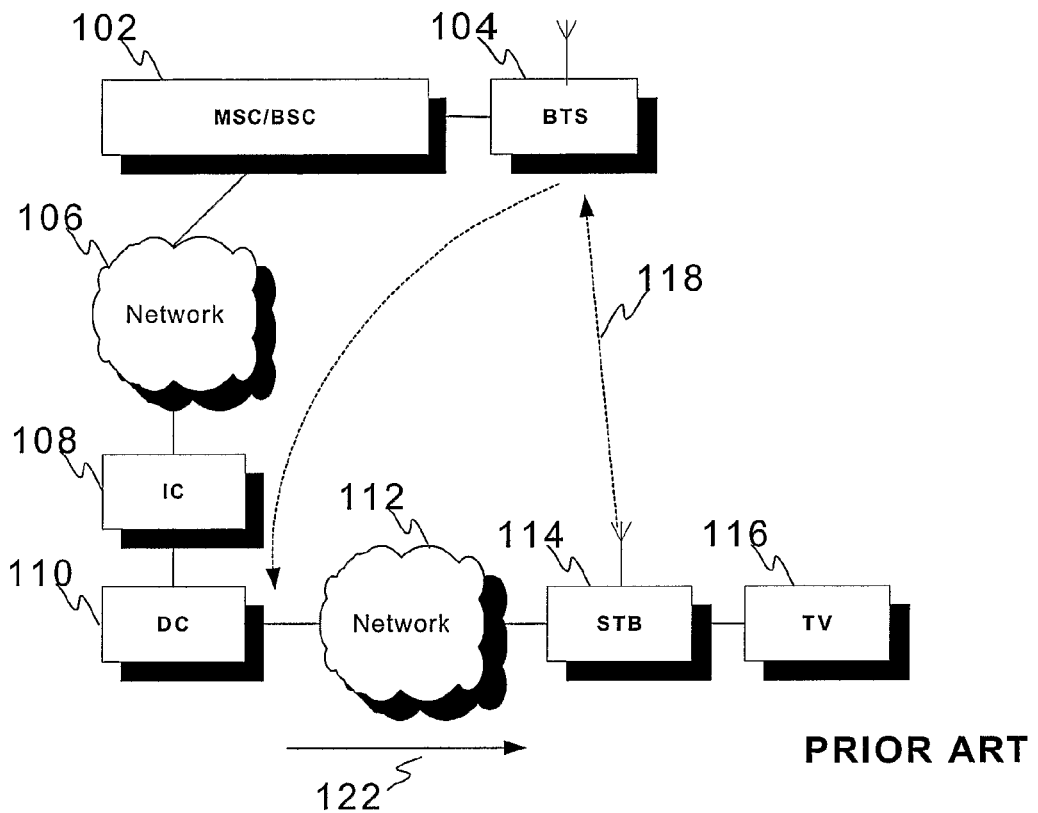
FIG. 1 depicts the cited prior art solution targeted to a DVB system.

FIG. 1 was already described above in conjunction with the description of relevant prior art.

Figure 2:
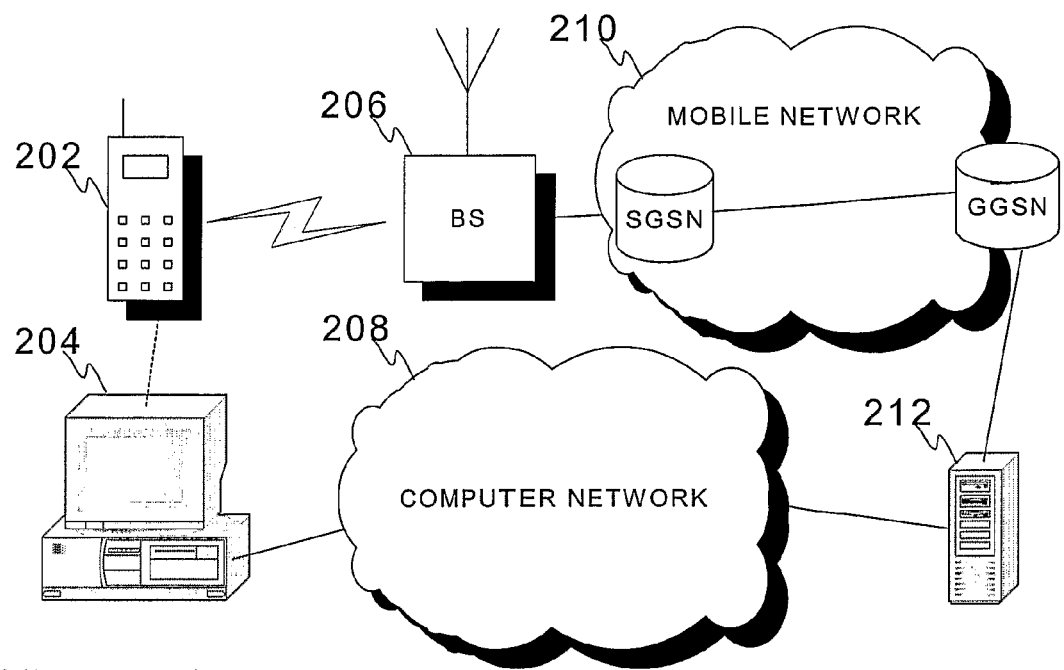
FIG. 2 illustrates the aforesaid concept of the invention in which a wireless channel is utilized in addition to the fixed one upon need.

A basic scenario of the invention is sketched out in FIG. 2. The user of a computer device with a fixed network connection, e.g. PC 204 with a standard Ethernet adapter, is connected to computer network 208, e.g. the Internet, through a local area network (LAN), for example. The PC is commanded by an application or explicitly by a user, for example, to download one or more data elements forming a data aggregate from a data source, e.g. server 212 that is either directly, or via intermediary devices/network(s), connected to network 208 as well. A specific software/hardware block embedded in PC 204 recognizes the available data transfer resources of mobile terminal 202 and initiates a parallel data transfer connection to data source 212 through mobile network 210 including e.g. a RAN (Radio Access Network), a core network and possibly other joined networks by utilizing mobile terminal 202 wirelessly connected to mobile network 210 via base station 206 in order to acquire the data element with accelerated rate. Mobile terminal 202 may be connected to PC 204 by wireless or wire-based means; see the dotted line.

Figure 3:
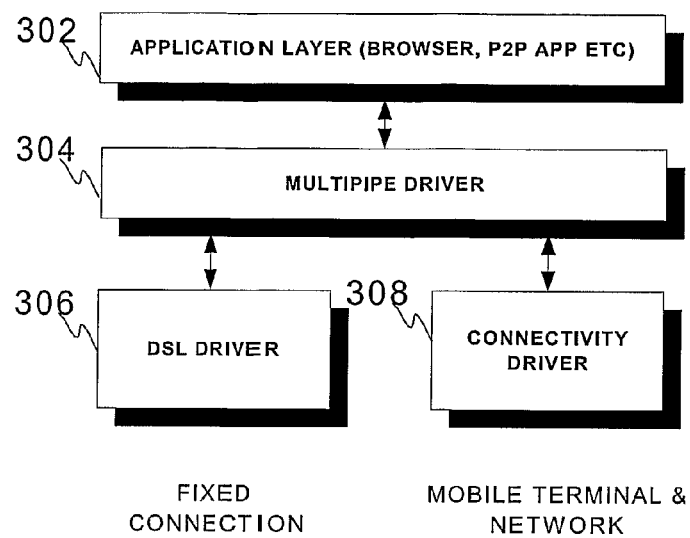
FIG. 3 is further outlines the principles of the invention with an implementation example.

In FIG. 3 the aforementioned scenario is expanded regarding one possible technical solution for fulfilling the above task. The invention comprises a personal computer (PC), which can be a desktop or laptop model, a mobile terminal supporting e.g. WCDMA, WCDMA/HSDPA or EDGE techniques, and associated software with multi-pipe driver (MPD) 304 and/or tailored hardware installed. The PC is connected to the Internet by a fixed (e.g. ISDN or xDSL) connection and to the mobile terminal by whatever suitable interface (cable, IrDA, Bluetooth etc). MPD 304 managing the data transfer (~reception from the computer's viewpoint) according to the principles of the invention is logically located between xDSL driver 306 and application layer 302. This module interfaces with application layer 302, xDSL driver 306 and mobile connectivity driver 308.

MPD 304 preferably includes some user-definable settings that can be altered through control software, for example. MPD 304 can be set active whenever the computer is turned on. Furthermore, MPD 304 may be programmed to monitor the usage of the fixed pipe, and in case that the pipe seems to be completely reserved, or other condition applies according to the performed analysis, MPD 304 will open the wireless pipe by requesting an additional transmission from the data source through the wireless network by using the mobile terminal as an access device. The fixed pipe should typically be selected as the primary data interface thus, in a normal case, minimizing the originated data transfer costs to the user and maximizing the data transfer speed. Most of the time (web browsing, email, chat etc) the fixed pipe will probably be more than sufficient to serve the applications run by the user. The analysis that leads up to opening the wireless pipe can be pre-programmed or be at least partly user-definable at MPD's 304 memory. The analysis may include simple threshold type rulings; when MPD 304 detects that the fixed pipe is used to its full capacity and/or some other limit or a number of limits are exceeded/not met, it will open a new pipe over the wireless network and expand it until additional bit rate no longer increases throughput, for example. This means that the bottleneck in the transfer is no longer in the "last mile" connection and the connection represents a best effort to move the file in question. When the transfer is complete (fixed pipe no longer at threshold capacity) the wireless pipe can be released without delay.

MPD 304 may be set not to give any error messages if the interface to the mobile terminal is unavailable. Alternatively, the user may be informed about potential benefit of using additional wireless data transfer capacity if connected to MPD 304. It is up to the user to connect the terminal and he/she can be informed e.g. by a small onscreen icon if the additional capacity is in principle available. The connection to the Internet will be fully functional even if the terminal isn't present. However, if the terminal is present and the fixed connection is unavailable (due to maintenance by the operator or some other reason) MPD 304 will open a pipe of required size solely over the wireless protocol. In this case the invention serves to guarantee an adequate net access in "network down" situations and can improve service availability.

One key point resides in a feature that the allocation and disallocation of the wireless pipe can be done fully or semi-transparently and without input from the user. The user will only experience better download performance in addition to his/her normal experience using the fixed connection unless he/she is willing to, for example, manually accept by pressing a button in a pop-up menu etc the use of additional transfer resources. In case of WCDMA, the user can also use the mobile terminal normally for voice or other applications since WCDMA supports multiple simultaneous connections.

The size of the bit pipe commissioned from the wireless network depends on the transfer situation. The smallest sufficient pipe is chosen in order to minimise the transfer time, or alternatively the largest pipe given by the network in case the sum of fixed and wireless capacity is still less than the rate data is arriving from the Internet.

EXAMPLE 1

An example is a 1 Mbyte file downloaded over a 256 kbit/s ADSL connection. Without a second pipe the download will take 32 seconds. If another pipe is made available, for example a 384 kbit/s pipe over WCDMA, with transfer will complete in 13 seconds. The wireless pipe is open only for these 13 seconds.

EXAMPLE 2

This example illustrates the flexible nature of the interfaces in the present invention. The user sits by her computer with her terminal in her pocket. As she does this, MPD 304 will detect the presence of the terminal via Bluetooth. As she uses the computer, MPD 304 will occasionally commission a WCDMA pipe to facilitate a few large email attachment downloads and accesses to shared network folders. During this time, she can still answer and place calls and use her mobile normally, since WCDMA supports multiple simultaneous connections. In case there is no fixed network in the computer, then each user will have his/her own mobile forward all incoming traffic to/from the net—and be billed for it accordingly. This can be useful in some situations where users share computers.

Performance:

Examples of percentage-wise increases in transfer capacity for various fixed and wireless pipes are presented in the following table:

TABLE 1

| Fixed line capacity, kbps | Wireless pipe, kbps | Performance increase, % |
|---|---|---|
| 64 | 128 | 200 |
| 128 | 256 | 100 |
| 256 | 960 | 375 |
| 512 | 384 | 75 |
| 1024 | 384 | 37 |

We notice that the performance gains are more pronounced for the most common, ISDN and 256/512 kbit/s DSL lines. These users form the main target group for the invention. However, HSDPA would even gain the users with the fastest DSL lines.

The salient points in the present invention are, for example, the following:

1) Use of wireless pipe to complement a fixed pipe in situations where the fixed pipe causes congestion.

2) Transparency of operation from the user if preferred.

3) Use of MPD 304 or similar SW structure to dynamically respond to changing load.

Reverting to the scenario of FIG. 3, a question arises how the data should be transferred from a single source to a single destination by utilizing at least two data pipes. Data transfer may be first initiated by the fixed primary pipe alone, and after a while, MPD 304 activates the wireless pipe for additional transfer capacity. As the preferred data aggregate is to be transferred through two pipes of different transfer rate and nature, MPD 304 should assess a proper location in the aggregate to start with the additional data transfer.

Figure 4:
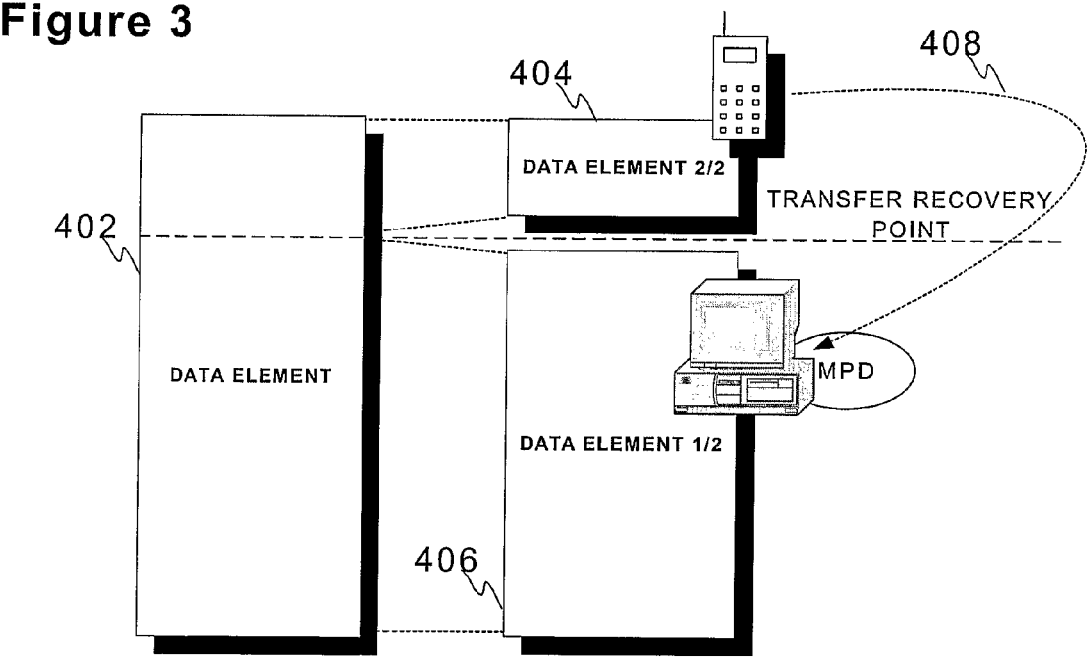
FIG. 4 illustrates a data aggregate and portioning thereof.

For an example, let's assume that the size of the file to be transferred is around 20 Mbits and the speed of the primary pipe is ~100 kbit/s and the speed of secondary pipe is ~25 kbit/s. See FIG. 4 for clarification. What is the proper location in data element 402, e.g. a file, to start downloading portion 404 of the complete element with the secondary wireless pipe if e.g. a first portion of 500 kbits, marked with reference sign 406 in the figure, has already been transferred from the beginning by utilizing solely the primary pipe? X shall denote the remaining time in seconds for the completion of data transfer.

$$500 \text{ kbit} + 100 \text{ kbit/s} * X + 25 \text{ kbit/s} * X = 20000 \text{ kbit} =>$$

$$125 \text{ kbit/s} * X = 19500 \text{ kbit} =>$$

$$X = 156 \text{ s}$$

Thus the remaining time for data transfer equals to 156 seconds provided both the pipes are exploitable to the maximum extent.

A proper location to initiate data transfer with the secondary pipe can then be calculated with 500 kbit+156 s*100 kbit/s=16100 kbit.

An optimum location according to this approach to start downloading a file with the secondary pipe would thus be the 16101st bit of the total of 20 Mbits. Depending on the memory and data transfer capabilities of both the mobile terminal and the computer, the terminal may pass 408 the data blocks (e.g. packets) upon arrival directly to the computer or wait until the whole portion has been retrieved and then forward it to the computer. Likewise, a total of three or more pipes may be utilized for transferring the data aggregate.

How can, in practise, the data transfer be initiated starting from within a data aggregate? Of course, if the aggregate consists of multiple data elements (files, for example) that are independently available/accessible at the data source, the simplest solution is to utilize the natural borders of data elements for determining the proper starting point with an additional pipe. Obviously, in most cases this kind of approach with coarser resolution does not result in the most optimal solution vis-à-vis more precisely defined starting points determined by utilizing e.g. the afore-explained formulas. One option that may enable direct exploitation of the determined starting point within the aggregate exploits data transfer resume/recovery feature (like in classic Zmodem protocol), which supports defining a certain offset from which to start downloading, or corresponding procedures existing in many contemporary communication systems and protocols thereof (see the dash line in FIG. 4).

Figure 5:
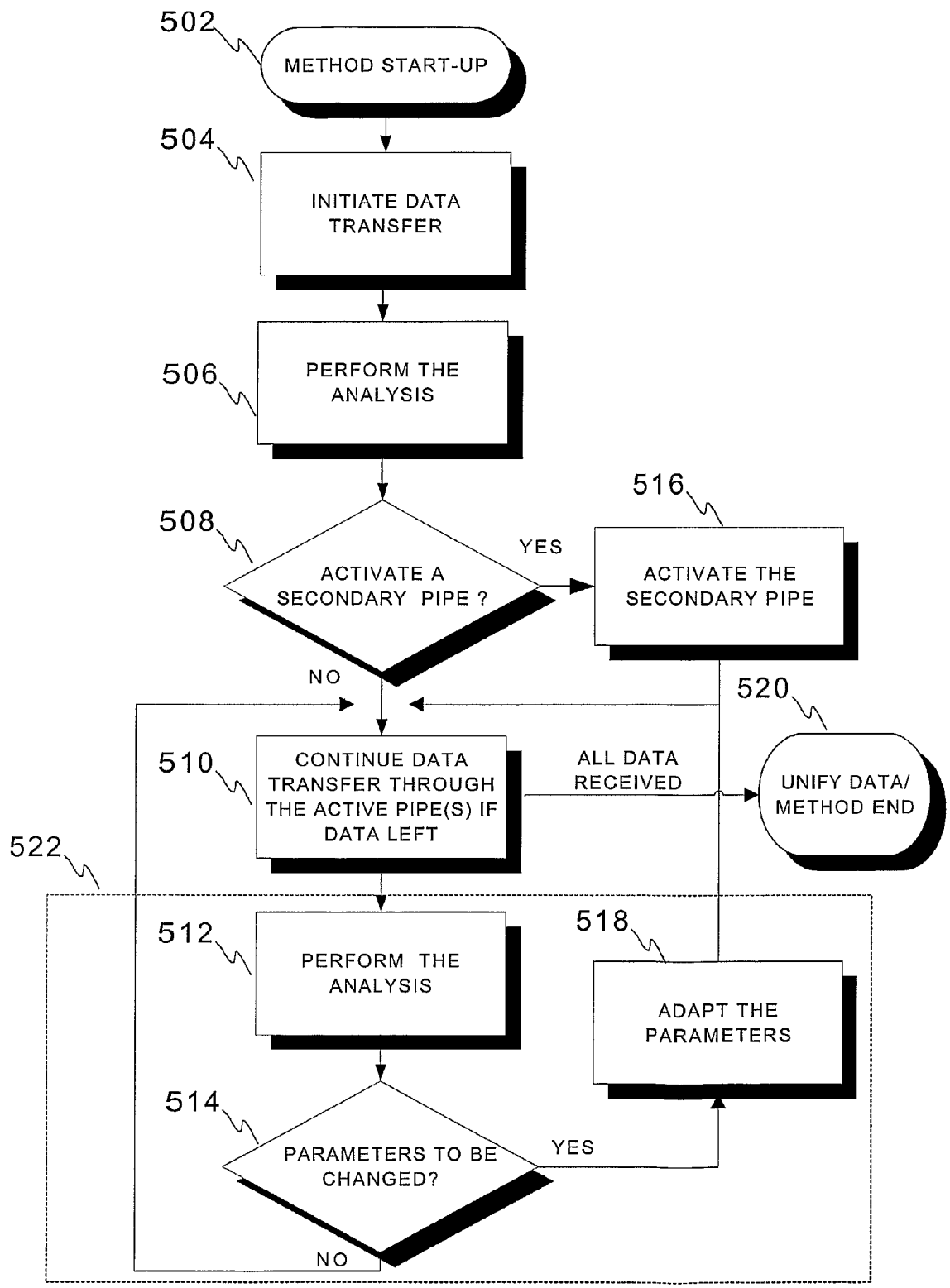
FIG. 5 is a flow chart of the method of the invention.

FIG. 5 discloses a flow chart of the method in accordance with the principles of the invention as described hereinbefore.

In step 502 at method start-up the necessary code, for example an MPD, is loaded to the memory of the executing device, and the user either directly or through automated functionalities commands data transfer from a data source. Moreover, the MPD may during the start-up and, for example, periodically also afterwards scan for available devices capable of forming wireless pipes in accordance with the invention. Such scan methods include Bluetooth/IR (Infra-Red) connection establishment procedures as well as simple physical interface queries whether a suitable device is connected to the executed device through a cable. In step 504 data transfer is initiated by establishing a data transfer connection (~link) with the data source by utilizing the primary, e.g. a fixed, connection. The mutual hierarchy of connections is advantageously still user-definable, and also a wireless link may be prioritised over a fixed one.

In step 506 the MPD recognises the initiation of data transfer and performs analysis on the established connection on the basis of one or more factors such as the amount of data to be transferred, primary link maximum speed, primary link current speed, estimated primary link future speed, possible secondary link(s) maximum speed, secondary link(s) approximated average/current speed, and transfer time vs. cost comparisons, for example. Such time/cost comparisons that can be calculated from e.g. connection parameters (price per time unit, price per data unit etc) set by the user and stored in the MPD may sometimes affect choosing to stay with one connection only although the data could be transferred more rapidly by utilizing one or more secondary links. For example, definition can be made not to utilize cost-causing secondary link(s) if the download time reduces less than a certain percentage or a certain explicit time period only.

However, if the secondary link through a wireless pipe shall be activated, which is checked in step 508, it's done in step 516. In practise the MPD shall command the available mobile terminal to create a connection to the data source and fetch data starting from a certain pre-determined point as described earlier.

Data is transferred through active pipes in step 510 and, optionally, e.g. in a periodical (or per received data unit) manner further analysis is performed, see step 512. Such analysis may further determine the need, which is checked in step 514 and conditionally executed in step 518, to activate new pipes if available (or to close a number of existing ones if e.g. some pipe has dramatically gained/lost speed lately and made itself or the other pipes in practise useless), reallocate some of the existing pipes for new connections become necessary due to e.g. new and urgent file transfer requests, and store e.g. connection statistics (average speeds etc) in a database for even more exact pipe allocations in the future.

After all the data has been received (or connections are terminated for other reasons) the method is ended in step 520. The data blocks transferred through a number pipes are here joined together by the latest. Alternatively, it's possible to construct a skeleton for the transferred data aggregate as a whole to which different pipes directly drop the received data in a proper position; the received data portions are unified with each other. After finishing the transfer, such skeleton advantageously automatically corresponds to the data downloaded through a single pipe only and may be stored in or forwarded to a preferred location. As to the primary connection via which the first portion of the downloaded data is typically transferred, the MPD may naturally cease the data transfer thereof immediately after the location from which the rest of the pipes have started downloading is reached to avoid unnecessary allocation and utilization of data transfer resources.

As alternative/supplementary solution to the one of FIG. 5, before starting any data transfer through pipes, the MPD may retrieve the size of data to be transferred either from the data source or from the user/user application (if available) and estimate optimum division of data pipes for the transfer and other aforesaid analysis, after which one or more pipes are allocated and the actual payload data transfer is ready to begin.

Dotted line marked with reference sign 522 has been used to group the method steps considered as optional together.

Figure 6:
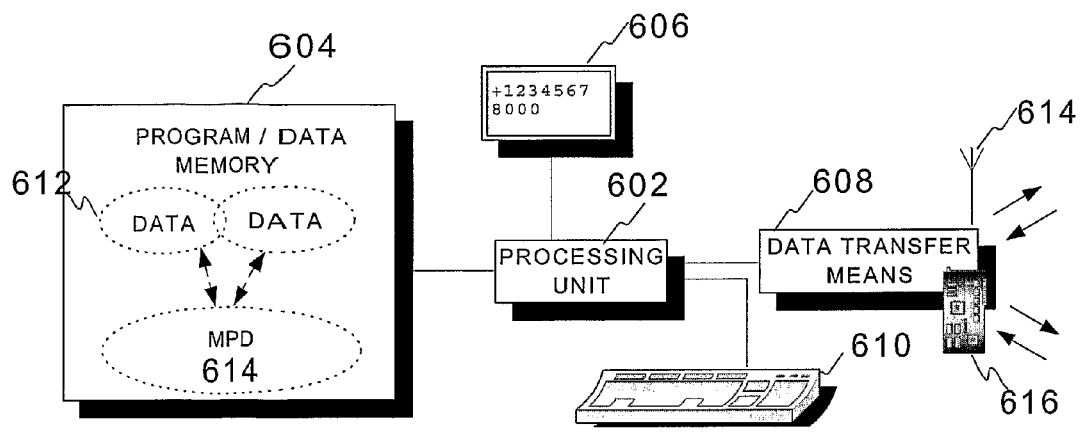
FIG. 6 is a block diagram of a device of the invention.

FIG. 6 discloses a block diagram of basic components for a device such as a computer capable of acting as a multi-pipe access host. Processing unit 602 controls the execution of actions in accordance with instructions 614 e.g. in a form of an application (multi-pipe driver etc) stored in memory 604 optionally comprising also data 612 downloaded to the device in accordance with the invention or containing settings, statistics etc. A data transfer module (means) 608 may include both a wireless module (means) 614 like a radio/infrared transceiver and also wireless network (WLAN etc) adapters, or a fixed module (means) 616 such as a conventional network adapter (Ethernet card etc), for example. A keyboard or other data input module (means) 610 and display 604 are useful in providing a user with an interface for managing and controlling the device.

Software for implementing the method of the invention may be provided on a carrier medium like a floppy disk, a CD-ROM, and a memory card, for example.

Figure 7:
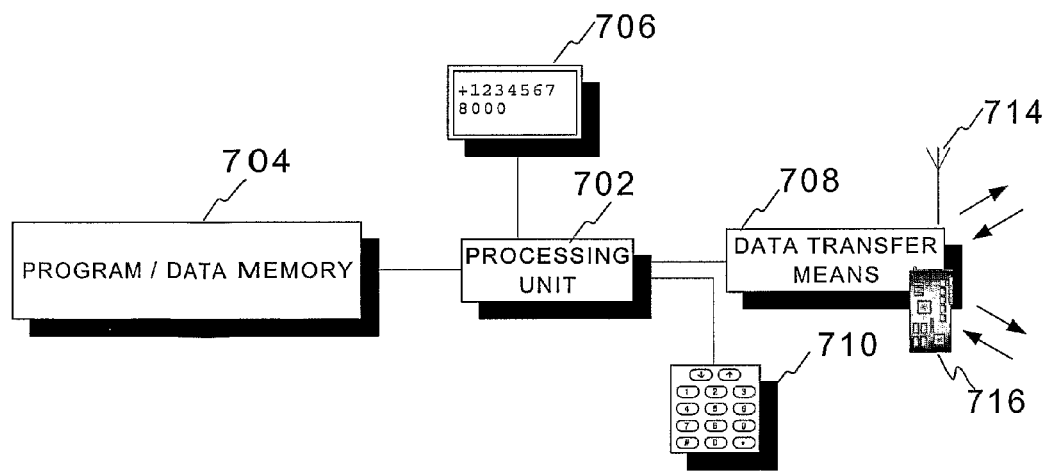
FIG. 7 is a block diagram of a wireless communications device of the invention.

Likewise, the wireless communications device utilized in the invention, a block diagram of which is shown in FIG. 7, comprises a processing unit 702, a program/data memory 704, a data transfer module (means) 708 that may be wireless 714, or both wireless 714 and fixed 716 (e.g. a cable connector) capable of connecting the wireless communications device both to the multi-pipe access host and to the wireless network, and optionally comprising display 706 in addition to keypad 710 for implementing a sufficient UI.

The protocols and protocol stacks utilized in the information transfer according to the invention can be selected from the existing ones, as the transfer capabilities required for implementing the invention as such are not particularly complex or special, which can be seen as one benefit of the invention. The invention may be realized as an additional software/hardware module or a combination of both as included or at least connected to the device requiring the data to be transferred.

It should be obvious to a one skilled in the art that different modifications can be made to the present invention disclosed herein without diverging from the scope of the invention defined by the claims. For example, utilized devices and methods steps may vary still converging to the basic idea of the invention. As one observation, the mobile terminal enabling the use of a wireless data transfer pipe can in practise be categorized as a mobile phone, a PDA, a communication enabled handheld game console/entertainment device etc, for example. Hence the invention generally applies to most such devices that support wireless communication and can be connected both to the destination device and to the data source with sufficient data transfer capability.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. A method comprising:
   enabling a destination apparatus to connect to a data source through a first connection utilizing a fixed communications network,
   establishing, during a transfer of a data aggregate through the first connection, at the destination apparatus a second connection to the data source via a wireless communications device operable in a wireless communications network,
   receiving one portion of the data aggregate divided into portions through the first connection and another portion of the data aggregate divided into portions through the second connection, and
   joining said portions of the data aggregate together to reconstruct said data aggregate.

2. The method of claim 1, further comprising performing analysis on the basis of at least one of the following: a connection maximum speed, a connection current speed, an estimated future speed of a connection, amount of data to be transferred, estimated transfer time, and estimated transfer costs.

3. The method of claim 2, further comprising adapting a connection parameter on the basis of said analysis.

4. The method of claim 2, wherein said second connection is established conditionally at need due to the analysis result.

5. The method of claim 1, wherein a point in said data aggregate determining a beginning of said portion to be transferred through the second connection is established.

6. The method of claim 5, wherein said point is established on the basis of connection speed of one or more connections and the size of said data aggregate.

7. The method of claim 5, wherein data transfer from said determined point is initiated by utilizing a data transfer resume functionality.

8. The method of claim 1, wherein connection between the wireless communications device and the destination apparatus is wireless or wire-based.

9. The method of claim 1, wherein data transfer resources are allocated or released dynamically during a data transfer connection.

10. The method of claim 1, wherein prior to establishing said second connection an approval thereto is requested from the user of said destination apparatus.

11. The method of claim 1, wherein establishing or releasing said second connection is transparent to the user of said destination apparatus.

12. An apparatus comprising:
    a processor, and
    a memory comprising computer program code, the memory and the computer program code configured to, with the processor, cause the apparatus to perform at least the following:
    enabling the apparatus to connect to a data source through a first connection utilizing a fixed communications network,
    establishing, during a transfer of a data aggregate through the first connection, at the apparatus a second connection to the data source via a wireless communications device operable in a wireless communications network,
    receiving one portion of the data aggregate divided into portions through the first connection and another portion of the data aggregate divided into portions through the second connection, and
    joining said portions of the data aggregate together to reconstruct said data aggregate.

13. The apparatus of claim 12 that is further caused to perform checking what wireless communications devices or connections are available for data transfer.

14. The apparatus of claim 12 that is further caused to perform performing analysis on the basis of at least one of the following: a connection maximum speed, a connection current speed, estimated future speed of a data transfer connection, amount of data to be transferred, estimated transfer time, and estimated transfer costs.

15. The apparatus of claim 14 that is further caused to perform adapting a connection parameter on the basis of said analysis.

16. The apparatus of claim 14 that is further caused to perform establishing a connection conditionally at need due to the analysis result.

17. The apparatus of claim 12 that is further caused to perform establishing a point in said data aggregate determining a beginning of said portion to be transferred through the fixed or wireless communications network.

18. The apparatus of claim 17 that is further caused to perform establishing said point on the basis of connection speed of one or more connections and the size of said data aggregate.

19. The apparatus of claim 17 that is further caused to perform initiating data transfer from said determined point by utilizing a data transfer resume functionality.

20. The apparatus of claim 12, wherein connection to the wireless communications device is wireless or wire-based.

21. The apparatus of claim 12, wherein connection to the fixed communications network is wireless or wire-based.

22. The apparatus of claim 12 that is further caused to perform allocating or releasing data transfer resources dynamically during a data transfer connection.

23. The apparatus of claim 12 that is further caused to perform requesting for confirmation from the user of the apparatus prior to establishing said connection through the wireless communications network via the wireless communications device.

24. The apparatus of claim 12 that is further caused to perform allocating or releasing a connection transparently from the user.

25. The apparatus of claim 12 that is a mobile terminal, a personal digital assistant, or a computer.

26. The apparatus of claim 14 that is further caused to perform allocating the capacity of the connection through the wireless communications network according to the analysis result.

27. The apparatus of claim 25 that supports at least one of the following technologies: global system for mobile communications, wideband code division multiple access, enhanced data rates for GSM evolution, or high-speed downlink packet access.

28. The apparatus of claim 12, wherein said data aggregate is a computer file or a combination of multiple files.

29. A computer program product comprising a computer-readable medium having computer program code embodied therein for execution with a computer, the computer program code comprising:

code for enabling the computer to connect to a data source through a first connection utilizing a fixed communications network, code for establishing, during a transfer of a data aggregate through the first connection, at the computer a second connection to the data source via a wireless communications device operable in a wireless communications network, code for receiving one portion of the data aggregate divided into portions through the first connection and another portion of the data aggregate divided into portions through the second connection, and code for joining said portions of the data aggregate together to reconstruct said data aggregate.

* * * * *